3,062,876
PROCESS FOR RECOVERY OF GOSSYPOL FROM COTTONSEED GUMS

Walter A. Pons, Jr., New Orleans, and Joseph Pominski and William H. King, Metairie, La., assignors to the United States of America as represented by the Secretary of Agriculture
No Drawing. Filed July 6, 1959, Ser. No. 825,372
10 Claims. (Cl. 260—520)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to the isolation of gossypol, the principal pigment of the cottonseed. More particularly, the invention provides a process for the recovery of gossypol from cottonseed gums.

Cottonseed gums, a low cost by-product obtained by water-washing of crude cottonseed oil, contain considerable quantities of gossypol and phosphatides. These gums are currently being produced from crude oil processed from the seed by direct solvent extraction, but it has been reported that a similar degumming process is also applicable to conventional screw-pressed and pre-pressed oils. It has been estimated that at one solvent extraction plant cottonseed gums are presently produced at an annual rate of about 2,000 tons, representing a potential source of some 200,000 lbs. of gossypol. Although this potential source material for the production of gossypol has been known for quite some time, no satisfactory and practical process for the recovery of said possypol was available. Gossypol is known to have useful properties as an antioxidant. It should also be potentially useful in the field of biologically active compounds, pharmaceuticals, and the like, and as a chemical intermediate.

An object of the present invention is to provide a practical process for the recovery of gossypol from cottonseed gums. Another object is to provide a process whereby gossypol can be isolated either in the uncombined form, or in the combined form as its acetic acid addition compound or as dianilinogossypol. A collateral object is to provide a means of isolating phosphatides from cottonseed gums.

In general, according to the process of the present invention, the gums are first subjected to an acid hydrolysis in methyl ethyl ketone, a solvent in which both water and phosphatides have limited solubility, to release gossypol from combination with phosphatides; the hydrolysis mixture is separated into a supernatant methyl ethyl ketone phase containing the gossypol substantially free of phosphatides, and a lower phosphatide-water phase, the latter being washed with methyl ethyl ketone to remove any remaining gossypol; then the combined methyl ethyl ketone supernatant phase and washings are concentrated, and gossypol is isolated from the concentrate either as the acetic acid addition compound or as dianilinogossypol. If desired, gossypol in an uncombined form can also be produced by the process of the invention by dissociating the isolated gossypol acetic acid in dilute sodium carbonate solution under non-oxidative conditions, or by hydrolysis of the isolated dianilinogosspol according to conventional procedures. The phosphatide residue remaining after washing the phosphatide-water phase with methyl ethyl ketone to remove gossypol can be stripped of residual solvent to produce a valuable phosphatide by-product.

The step for acid phydrolysis of the gums is an important and critical step in the present process. We found that when gums were dissolved in hexane and the phosphatides isolated by acetone precipitation, over 70% of the gossypol was present in the phosphatide fraction in a "bound" or combined form. In this form the gossypol could not be removed by extraction with acetone, which is ordinarily an excellent solvent for gossypol. This made it necessary to hydrolyze or split the gossypol-phosphatide combination prodcct and to separte gossypol from surface-active phophatides prior to isolation. We have discovered that methyl ethyl ketone is a particularly good solvent for achieving this separation. Gossypol is very soluble in methyl ethyl ketone, while both phosphatides and water have limited solubility in this solvent. The methyl ethyl ketone solvent used in the acid hydrolysis step of the present process can either be anhydrous or it can contain water. The methyl ethyl ketone-water azeotrope which contains 11% water by weigh and boils at 73.5° C. in particularly suitable since it can be readily reclaimed by simple distillation and reused in the process. In conjunction with the methyl ethyl ketone solvent, it is also necessary to use a sufficient quantity of an acid which can effectively hydrolyze and release gossypol from the aforementioned "bound" form, without signficantly degrading or altering the physical properties of the phosphatides. Strong mineral acids, such as hydrochloric or sulfuric acids, split the gossypol-phosphatide combination product but subsequent separation of the phosphatides from the liberated gossypol is difficult. We have found that oxalic or orthophosphoric acids are particularly suitable acids for achieving the hydrolysis. Being weaker acids, their use allows cleavage of the gossypol-phosphatide reaction product, while the phosphatides themselves are not degraded and can be effectively separated by means of their insolubility in methyl ethyl ketone or methyl ethyl ketone-water azeotrope. Where toxicity is a consideration, it is preferred to use phosphoric acid to hydrolyze the gums. The gums to be processed for gossypol should not be heated excessively, otherwise the yield and purity of product is considerably lowered.

In carrying out the acid hydrolysis of the gums, the amount of acid incorporated into the methyl ethyl ketone solvent, the gums-to-solvent ratio, and the temperature, pressure and length of hydrolysis can be varied depending on the rapidity and extent of hydrolysis desired by the operator. We prefer to incorporate sufficient acid into the methyl ethyl ketone to give a solution which is about 0.2 molar with respect to oxalic acid, or which is about 0.4 molar, in acid if orthophosphoric acid is used as the hydrolyzing acid. It is generally preferred to use a gums-to-acid containing solvent ratio of about 1 to 0.84 by weight in the hydrolysis step. It is unnecessary and uneconomical to use larger amounts of acid-containing solvent than this. Smaller amounts of the solvent produce viscous mixtures which are difficult to process. It is convenient to carry out the hydrolysis under reflux conditions at reflux temperature and at atmospheric pressure while mechanically stirring or mixing the gums-acid solvent mixture. Under these conditions, maximum hydrolysis is achieved in 1 hour using the aforementioned concentration of oxalic acid or in 2 hours if the preferred concentration of phosphoric acid is employed. If the operator desires a more rapid hydrolysis, as for example where a continuous process is used, the hydrolysis can be carried out at higher temperatures under pressure. For example, maximum hydrolysis can be achieved in about 10 minutes at 250° F. and 50 p.s.i. pressure, or in about 4 to 5 minutes at 310°–325° F. and 165–175 p.s.i. pressure.

Following the completion of the hydrolysis step, the hydrolysis mixture is allowed to cool and separate into an upper or supernatant methyl ethyl ketone layer containing the gossypol substantially free of phosphatides, and a lower phosphatide-water layer. Cooling to a temperature of about 50° F. or lower is generally satisfactory. The upper layer is then segregated from the lower layer by any of the usual procedures, such as decantation, siphoning, centrifugation and the like. In order to obtain maximum yield of product, it is then desirable to wash the phosphatide-water layer with acid-free methyl ethyl ketone solvent, using any of the conventional washing procedures, until substantially all of the hydrolyzed gossypol contained in said layer is removed by solution in the methyl ethyl ketone. Countercurrent washing is advantageous, particularly when the operator desires to use continuous hydrolysis and washing steps in the process of the present invention. The washings are combined with the initial methyl ethyl ketone layer containing the bulk of the gossypol and reserved for subsequent processing. The phosphatide residue which remains can be stripped of residual solvent to produce a valuable phosphatide by-product in the process of the present invention. The reclaimed solvent can be reused in the process.

The combined methyl ethyl ketone solutions containing the gossypol are then concentrated by distillation in the usual manner to a "methyl ethyl ketone concentrate" having a volume suitable for efficient precipitation of gossypol as its acetic acid addition compound or as dianilinogossypol. The methyl ethyl ketone reclaimed by the distillation can be reused in the process. It is generally preferred to concentrate to a volume approximately one-half as large as the volume of acid-containing methyl ethyl ketone solvent employed for the hydrolysis of the gums. Much further concentration is not desirable, since extremely viscous and oily concentrates are produced from which it is difficult to isolate the gossypol compounds. Neutral oil and other impurities present in the concentrate contribute to this effect.

For isolating the gossypol from the "methyl ethyl ketone concentrate" by precipitation as the acetic acid addition compound, the acetic acid-to-concentrate ratio can be varied, as well as the time and temperature of precipitation. Either high ratios of acetic acid or long precipitation times lead to similar recoveries of gossypol acetic acid. It is preferable to use glacial acetic acid, although small amounts of water can be tolerated in the precipitating agent. A volume ratio of acetic acid to concentrate of 1:3, and a precipitation time of 1 hour at room temperature (about 25° C.) is usually preferred. It is desirable to use stirring during mixing of the acetic acid and the concentrate, and to continue stirring until crystallization of the gossypol acetic acid begins. Yields of gossypol acetic acid are not increased appreciably by using ratios of acetic acid higher than 1:3, or by extending the precipitation time beyond 1 hour at room temperature. Precipitation at temperatures below room temperature is not beneficial; and precipitation at temperatures as high as 65° C. results in incomplete crystallization of the gossypol acetic acid. At the end of the precipitation time, the precipitated gossypol acetic acid is isolated by any of the customary procedures, such as filtration, centrifugation and the like, and it is then freed of oil and other impurities by washing with hexane or a similar oil solvent until the washings are colorless. Vacuum filtration and washing are particularly desirable. The washed product can either be air-dried at room temperature, if protected from light, or vacuum dried at low temperature, for example at 50° C., to yield a "crude" gossypol acetic acid usually of about 92–95% purity. If the operator desires, the methyl ethyl ketone-acetic acid solution remaining after isolation of the crude gossypol acetic acid product can be further processed to give methyl ethyl ketone and acetic acid distillates and a second crop of gossypol acetic acid which can be recycled to the process. Similarly, the hexane washings of the crude gossypol acetic acid can either be further processed or discarded.

Alternatively, gossypol can be isolated from the aforementioned "methyl ethyl ketone concentrate" by addition of a stoichiometric excess of aniline to the concentrate to produce dianilinogossypol. The precipitated dianilinogossypol is easily isolated by filtration, centrifugation, and the like conventional procedures. The product is essentially free from phosphatides and it usually has a purity of about 84%. If the operator desires, the dianilinogossypol can be further purified by conventional methods; or it can be converted to gossypol in the usual manner [W. H. King and F. H. Thurber, J. Am. Oil Chemists' Soc. 33, 169–71 (1956)]. Since recovery of gossypol from dianilinogossypol is at present more difficult and costly than recovery from gossypol acetic acid, the latter procedure is generally preferred.

In the case where gossypol is isolated as "crude" gossypol acetic acid as previously described, the gossypol acetic acid can be further purified to the desired purity by recrystallization techniques. It is usually preferred to dissolve the gossypol actic acid in methyl ethyl ketone-water azeotrope, and then add glacial acetic acid to the solution to precipitate gossypol acetic acid. Both of these steps can be conveniently carried out at room temperature. A ratio of 1 part by weight of gossypol acetic acid to about 5 parts by weight of methyl ethyl ketone-water azeotrope is preferred for solution, whereas about 1 volume of acetic acid added to 3 volumes of solution is adequate for the precipitation of the gossypol acetic acid. After dissolving the gossypol acetic acid in the methyl ethyl ketone-water solvent, it is usually desirable to filter or centrifuge the solution to remove traces of phosphatides and other impurities prior to the addition of the acetic acid. It is advantageous to use stirring or mixing to aid solution of the gossypol acetic acid in the methyl ethyl ketone-water solvent, and also subsequently while adding the acetic acid and until crystallization of the gossypol actic acid begins. One hour's standing at room temperature after crystallization begins is usually adequate for precipitation of the gossypol acetic acid. The precipitated gossypol acetic acid can be isolated by the usual procedures, such as filtration, centrifugation and the like; and it can be washed and dried as previously described for the "crude" gossypol acetic acid. The once-recrystallized gossypol actic acid can usually be repared from the "crude" gossypol actic acid in about 87% yield with a purity of about 97–98%. If further purification is desired, the product can be recrystallized in the same manner. Twice-recrystallized gossypol acetic acid (produced in about 77% yield from "crude" gossypol acetic acid) is usually of 99% purity which is an adequate purity for substantially any of its uses as a chemical intermediate. The methyl ethyl ketone-acetic acid solutions remaining after isolation of the recrystallized gossypol acetic acid products can be further processed to give methyl ethyl ketone and acetic acid distillates and additional crops of gossypol acetic acid which can be recycled to the process.

The isolated gossypol acetic acid can be readily converted to gossypol when it is desired to produce the free pigment in the process of the present invention. We have discovered a method for carrying out this conversion which is an improvement over prior art proceduires. Most prior art procedures employ organic solvents to dissolve the gossypol acetic acid and/or to extract and recrystallize the free gossypol produced by the dissociation of gossypol acetic acid. These procedures are not well-suited to large scale operations, and are costly due to the added solvent recovery problems. Simple acidification of sodium hydroxide solutions of gossypol acetic acid is likewise unsatisfactory since the gossypol produced in this manner is significantly degraded even when protected with reducing agents during the dissociation of the gossypol acetic acid. We have found that gossypol acetic acid can be dissolved in dilute aqueous sodium carbonate solution containing a small amount of a reducing agent, and then acidified with a stoichiometric excess of mineral acid, while protecting the system against air oxidation, to produce an essentially quantitative yield of substantially undergraded gossypol. The gossypol product is easily isolated by conventional methods, and it can be washed with water to remove acid and adsorbed salts, then dried according to conventional procedures. The method uses no organic solvents, it is economical, and is well-suited to large scale operations.

It is generally preferred to use purified gossypol acetic acid of about 99% or higher purity for the conversion to gosspol, since no increase in purity is normally achieved in converting the gossypol acetic acid to gossypol. The preferred conversion procedure is to dissolve 1 part by weight of gossypol actic acid in about 10 parts by weight of 0.2 molar aqueous sodium carbonate solution containing approximately 0.1% by weight of sodium hydrosulfite, or other equivalent reducing agent; add a small amount of hexane sufficient to form a thin layer on the surface of the carbonate solution to insure against air oxidation and to eliminate frothing caused by evolution of carbon dioxide during subsequent acidification; add about a 4% by weight aqueous solution of sulfuric acid with stirring until evolution of carbon dioxide ceases and the solution becomes acidic; then isolate the precipitated gossypol by filtration under reduced pressure, wash it with hot water until free of acid and salts, and vacuum dry the product at about 50° C. Mineral acids other than sulfuric acid can be suitably used for the acidification step. A protective atmosphere of an inert gas can be used in place of the hexane layer to insure against air oxidation during the acidification.

The following examples are illustrative of the details of at least one method of practicing the invention.

EXAMPLE 1

Two samples of cottonseed gums obtained from a commercial solvent extraction plant at different times during a processing season were used in these experiments. Gums "A" contained 42.1% moisture, 12.4% neutral oil, 31.5% phosphatides (total phosphorus x 25), and 5.04% total gossypol as determined by the usual methods. Gums "B" contained 43.3% moisture, 14.1% neutral oil, 31.0% phosphatides, and 4.60% total gossypol.

Four batch pilot plant scale runs (see Table I) were conducted as outlined below.

Isolation of Gossypol Acetic Acid

*Hydrolysis.*—Cottonseed gums, approximately 40 lbs., and methyl ethyl ketone (M.E.K.)-water azeotrope, 5 gals., which was either 0.2 molar in oxalic acid or 0.4 molar in phosphoric acid were mixed in a steam jacketed, stainless steel vessel, equipped with a stirrer and reflux condenser. The mixture was heated at reflux (167° F.) for either 1 or 2 hrs, with stirring, and cooled to approximately 100° F.

*Cooling and washing.*—The mixture was transferred to a cone shaped glass lined vessel equipped with a cooling coil and stirrer, and cooled to 50° F. The supernatant M.E.K. layer was decanted back into the reaction vessel. The lower phosphatide layer was washed successively by agitation with 2, 1, 1, and 1 gallon of M.E.K.-water azeotrope, allowing the mixture to settle and decanting the M.E.K. supernatant layer back into the reaction vessel each time.

*Concentration.*—The combined M.E.K. decantate and washings, 9 gallons, were concentrated to 3 gallons by distillation, and cooled to room temperature. The distillate (M.E.K.-water azeotrope), was reserved for subsequent reuse in the process.

*Precipitation.*—The M.E.K. concentrate, 3 gals., was transferred to a corrosion resistant tank equipped with a stirrer. Glacial acetic acid, 1.0 gallon, was added while the solution was stirred, and stirring was continued until crystallization began (10 min.). The solution was allowed to stand for 1 hour, or longer, at room temperature.

*Filtration.*—The supernatant M.E.K.-acetic acid was siphoned off, and the slurry of gossypol acetic acid was filtered on a coarse paper under reduced pressure. The product was washed with hexane until the washings were colorless (1 liter of hexane). The "crude" gossypol acetic acid was either air dried while protected from light, or vacuum dried for about 4 hours at 50° C.

Certain details of the processing conditions and yields of crude gossypol acetic acid from the gums are given in Table I.

TABLE I

| Cottonseed gums | | Hydrolysis | | | Crude gossypol acetic acid | | Recovery of gossypol from gums,[2] percent |
|---|---|---|---|---|---|---|---|
| Sample | Weight used, pounds | Acidic conditions | Time, hours | Gossypol removed from gums,[1] percent | Dry wt., grams | Purity, percent | |
| "A" | 42.6 | 0.2M—oxalic | 1 | | 549 | 93.2 | 47.5 |
| "A" | 41.1 | 0.4M—H₃PO₄ | 2 | 96.0 | 545 | 92.2 | 48.0 |
| "B" | 40.0 | 0.2M—oxalic | 2 | 91.4 | 496 | 93.8 | 49.9 |
| "B" | 40.0 | 0.4M—H₃PO₄ | 2 | 92.3 | 499 | 91.8 | 49.1 |

[1] Based on colorimetric analysis of M.E.K. concentrate for gossypol.

[2] $\text{Recovery} = \dfrac{\text{wt. gossypol acetic acid} \times \text{purity} \times 0.896}{\text{wt. gums} \times \text{percent gossypol}}$

Purification of "Crude" Gossypol Acetic Acid

*First recrystallization.*—Crude gossypol acetic acid, 1.1–1.2 lb., was dissolved in 0.75 gal. of M.E.K.-water azeotrope with stirring at room temperature, and filtered to remove traces of phosphatides and other impurities. Glacial acetic acid, 0.25 gal., was added with stirring. The solution was stirred until crystallization began and then allowed to stand 1 hour at room temperature (70°–75° F.). The gossypol acetic acid was filtered under reduced pressure, and washed with 0.25 gal. of hexane. If no further purification was required, the product was vacuum dried at 50° C. for 4 hours. The yield of dry, purified product was about 87% (0.94–0.96 lb.) with a purity of 97–98%.

*Second recrystallization.*—The product (0.94–0.96 lb. dry weight) from the first recrystallization was dissolved in about 2½ liters of M.E.K.-water azeotrope and processed as described above for the first recrystallization. The yield of twice-recrystallized product was 77% (0.85–0.92 lb.) with a purity of 99%.

Conversion of Gossypol Acetic Acid to Gossypol

Gossypol acetic acid of 99% purity, 1.0 lb., was dissolved with slow stirring in 1.20 gal. of 0.2 molar sodium carbonate solution containing 0.1% sodium hydrosulfite. A thin layer of hexane was floated on the surface of the solution. Sulfuric acid, a 4% by weight solution, was added with stirring until evolution of carbon dioxide ceased and the solution became acidic. The hexane layer was decanted and the precipitated gossypol filtered under reduced pressure using a coarse filter. The gossypol was washed free of acid with water and then vacuum dried for 16 hours at 50° C. The yield of gossypol was quantitative (0.896 lb.), the product having a purity of 97%.

EXAMPLE 2

A 40 lb. batch of cottonseed gums was hydrolyzed for 2 hours in M.E.K.-water azeotrope, 0.2 molar with respect to oxalic acid, and processed as described in Example 1 to give 10.8 liters of M.E.K. concentrate.

To 5.4 liters of the concentrate (equivalent to 20 lb. gums) was added 2.5 lb. of aniline with stirring. The dianilino-gossypol was allowed to precipitate over a 91-hour period, then filtered under reduced pressure and washed with about 500 ml. of hexane until the washings were colorless. The yield of crude dianlinogossypol was 384 grams with a purity of 82.4%. The recovery was 58.7% of the gossypol present in the 20 lbs. of gums.

EXAMPLE 3

A series of continuous pilot plant runs was conducted in which mixtures of cottonseed gums "A," M.E.K.-water azeotrope, and either phosphoric acid or oxalic acid, all present in the proportions described in Example 1, were hydrolyzed at elevated temperatures and pressures by pumping the mixtures through a stainless steel steam-jacketed heat exchanger, pressure being controlled by a spring-type back pressure valve. Following the continuous hydrolyses, each mixture was further processed as described in Example 1 to give crude gossypol acetic acid products. Certain details of the processing conditions and yields of crude gossypol acetic acid from the gums are given in Table II. In these experiments the maximum indicated temperatures were reached in about 1½ minutes, and the hydrolyses were then continued for the indicated holding times. It was noted that the material produced at the longer holding times was somewhat scorched, which probably accounts for the reduced yields at longer holding times.

TABLE II

| Acidic conditions | Hydrolysis | | | | Crude gossypol acetic acid, purity, percent | Recovery of gossypol from gums, percent |
| --- | --- | --- | --- | --- | --- | --- |
| | Holding time, min. | Temperature, °F. | Pressure, lbs./sq.in. | Gossypol removed from gums, percent | | |
| 0.2M—oxalic | 4.3 | 310 | 175 | 102 | 94.7 | 43.8 |
| 0.2M—oxalic | 12.9 | 325 | 175 | 86.0 | 96.3 | 24.5 |
| 0.4M—H$_3$PO$_4$ | 5.1 | 318 | 165 | 97.2 | 93.2 | 35.9 |
| 0.4M—H$_3$PO$_4$ | 15.5 | 325 | 176 | 97.7 | 96.5 | 28.9 |

EXAMPLE 4

A cooled hydrolysate obtained by 0.2 molar oxalic acid hydrolysis of cottonseed gums in M.E.K.-water azeotrope in the usual manner was countercurrently washed as follows. Hydrolysate equivalent to 500 g. of gums was placed in the bottom of a glass column, the column being equipped with an inlet tube near its lower end for introducing wash liquid, and an overflow tube near its upper end. The hydrolysate was stirred mechanically, while a total of 2 liters of methyl ethyl ketone was introduced through the inlet tube and allowed to percolate rapidly upwards through the hydrolysate. A total of 2880 ml. of wash liquid was collected out the overflow tube. During the countercurrent washing, two layers were readily maintained, the phosphatides retaining their usual aggregated form and remaining on the bottom.

The 2880 ml. of wash liquid was concentrated to about 260 ml. in the usual way, and 100 ml. of glacial acetic acid was added to the concentrate to precipitate crude gossypol acetic acid which was isolated in the manner previously described. The yield of crude gossypol acetic acid was 17.25 grams with a purity of 91%. The recovery was 51% of the gossypol present in the gums.

EXAMPLE 5

Batch hydrolyses were conducted in which mixtures of 500 g. cottonseed gums "C," M.E.K.-water azeotrope, and either oxalic acid or phosphoric acid, all present in the relative proportions described in Example 1, were hydrolyzed in a pressure vessel at elevated temperature and pressure. Following the hydrolyses, each mixture was further processed as described in Example 1 to give crude gossypol acetic acid products. Certain details of the processing conditions and yields of crude gossypol acetic acid from the gums are given in Table III.

TABLE III

| Acidic conditions | Hydrolysis | | | Crude gossypol acetic acid, purity, percent | Recovery of gossypol from gums,[1] percent |
| --- | --- | --- | --- | --- | --- |
| | Holding time, min. | Temperature, °F. | Pressure, lbs./sq.in. | | |
| 0.2M—oxalic | 10 | 250 | 50 | 94.2 | 49.5 |
| 0.4M—H$_3$PO$_4$ | 10 | 250 | 50 | 94.1 | 39.6 |

[1] Gums "C" contained 5.46% gossypol, 44.9% moisture, 16.4% neutral oil and 29.0% phosphatides.

We claim:

1. A process for the isolation of gossypol, from cottonseed gums, in a combined state as a member selected from the group consisting of gossypol acetic acid and dianilinogossypol, comprising acid-hydrolyzing cottonseed gums, containing gossypol combined with phosphatides, with an acid-hydrolyzing mixture containing methyl ethyl ketone and an acid selected from the group consisting of oxalic acid and orthophosphoric acid to release the gossypol from its combination with the phosphatides, separating the resulting methyl ethyl ketone phase, containing dissolved gossypol and which is substantially free from phosphatides, from the acid-hydrolyzed mixture, concentrating the methyl ethyl ketone phase to a volume not less than approximately one-half that of the volume of the acid-containing methyl ethyl ketone mixture employed to hydrolyze the cottonseed gums, reacting the gossypol in the methyl ethyl ketone concentrate with a member selected from the group consisting of acetic acid and aniline to convert the gossypol into a combined state as gossypol acetic acid and dianilinogossypol, respectively, and isolating the gossypol in such combined state.

2. The process of claim 1 wherein the acid-hydrolyzing mixture contains methyl ethyl ketone in the form of its water azeotrope.

3. The process of claim 1 wherein the acid contained in the acid-hydrolyzing mixture is oxalic acid.

4. The process of claim 1 wherein the acid-hydrolyzing mixture contains methyl ethyl ketone in the form of its water azeotrope, wherein the acid contained therein is oxalic acid, said azeotrope being present in the proportion of .84 part, by weight, per part by weight of cottonseed gums, and being about 0.2 molar with respect to oxalic acid, and wherein the acid-hydrolysis is conducted by heating for at least about one hour at reflux temperature and at atmospheric pressure.

5. The process of claim 1 wherein the acid-hydrolyzing mixture contains methyl ethyl ketone in the form of its water azeotrope, wherein the acid contained therein is oxalic acid, said azeotrope being present in the proportion of .84 part, by weight, per part by weight of the cottonseed gums, and being about .2 molar with respect to the oxalic acid, and wherein the acid-hydrolysis is conducted by heating for about from 4 to 10 minutes at a tempertaure ranging about from 250° to 325° F. and at a pressure ranging about from 50 to 175 pounds per square inch, the shorter heating time being used with the higher temperature and the higher pressure.

6. The process of claim 1 wherein the acid contained in the acid-hydrolyzing mixture is orthophosphoric acid.

7. The process of claim 1 wherein the acid-hydrolyzing mixture contains methyl ethyl ketone in the form of its water azeotrope, wherein the acid contained therein is orthophosphoric acid, said azeotrope being present in the proportion of .84 part, by weight, per part of the cottonseed gums, and being about 0.4 molar with respect to the orthophosphoric acid, and wherein the acid-hydrolysis is conducted by heating for at least about 2 hours at reflux temperature and at atmospheric pressure.

8. The process of claim 1 wherein the acid-hydrolyzing mixture contains methyl ethyl ketone in the form of its water azeotrope, wherein the acid contained therein is orthophosphoric acid, said azeotrope being present in the proportion of .84 part, by weight, per part by weight of the cottonseed gums, and being about 0.4 molar with respect to the orthophosphoric acid, and wherein the acid-hydrolysis is conducted by heating for about from 4 to 10 minutes at a temperature ranging about from 250° to 325° F. and at a pressure ranging about from 50 to 175 pounds per square inch, the shorter heating time being used with the higher temperature and the higher pressure.

9. The process of claim 1 wherein the member reacted with the gossypol in the methyl ethyl ketone concentrate is acetic acid.

10. The process of claim 1 wherein the member reacted with the gossypol in the methyl ethyl ketone concentrate is aniline.

References Cited in the file of this patent

UNITED STATES PATENTS

| | | |
|---|---|---|
| 2,570,582 | Miescher et al. | Oct. 9, 1951 |
| 2,606,922 | Papa et al. | Aug. 12, 1952 |
| 2,770,654 | Trapp | Nov. 13, 1956 |
| 2,809,997 | Johnston | Oct. 15, 1957 |

OTHER REFERENCES

American Oil Chemists' Society, Tentative Method Ba 8–55, pp. 1–3, April 22, 1957. (Copy in Sci. Library.)

King et al. (1): The Journal of the American Oil Chemists' Society, vol. XXX, No. 2, pp. 70–74, February 1953, 260–599G. (Copy in Division 63.)

King et al. (2): The Journal of the American Oil Chemists' Society, vol. XXXIII, No. 4, pp. 169–171, April 1956, 260–599G. (Copy in Division 63.)